United States Patent
Sirota et al.

(10) Patent No.: US 8,151,261 B2
(45) Date of Patent: Apr. 3, 2012

(54) SYSTEM AND METHOD FOR PACKAGING UPDATES

(75) Inventors: Josh Sirota, Cupertino, CA (US); Charlie Ma, Fremont, CA (US)

(73) Assignee: BMC Software, Inc., Houston, TX (US)

( * ) Notice: Subject to any disclaimer, the term of this patent is extended or adjusted under 35 U.S.C. 154(b) by 1364 days.

(21) Appl. No.: 11/676,580

(22) Filed: Feb. 20, 2007

(65) Prior Publication Data

US 2007/0180446 A1    Aug. 2, 2007

Related U.S. Application Data

(63) Continuation of application No. 10/298,860, filed on Nov. 18, 2002, now Pat. No. 7,194,728.

(60) Provisional application No. 60/417,583, filed on Oct. 10, 2002.

(51) Int. Cl.
G06F 9/45 (2006.01)
(52) U.S. Cl. ........................................................ 717/176
(58) Field of Classification Search .................... 717/176
See application file for complete search history.

(56) References Cited

U.S. PATENT DOCUMENTS

| | | | |
|---|---|---|---|
| 5,806,078 A | 9/1998 | Hug et al. | |
| 6,006,035 A * | 12/1999 | Nabahi | 717/175 |
| 6,052,531 A | 4/2000 | Waldin et al. | |
| 6,067,581 A | 5/2000 | Poerterfield | |
| 6,493,871 B1 | 12/2002 | McGuire et al. | |
| 6,594,822 B1 | 7/2003 | Schweitz et al. | |
| 6,735,766 B1 | 5/2004 | Chamberlain et al. | |
| 6,738,801 B1 | 5/2004 | Kawaguchi et al. | |
| 6,772,413 B2 | 8/2004 | Kuznetsov | |
| 6,925,467 B2 | 8/2005 | Gu et al. | |
| 6,986,135 B2 | 1/2006 | Leathers et al. | |
| 6,999,976 B2 | 2/2006 | Abdallah et al. | |
| 7,003,534 B2 | 2/2006 | Peng | |
| 7,194,728 B1 * | 3/2007 | Sirota et al. | 717/106 |
| 2002/0112232 A1 * | 8/2002 | Ream et al. | 717/176 |
| 2002/0194584 A1 | 12/2002 | Suorsa et al. | |
| 2004/0044999 A1 | 3/2004 | Gibson | |
| 2004/0060035 A1 | 3/2004 | Ustaris | |

* cited by examiner

*Primary Examiner* — John Chavis

(57) ABSTRACT

A system and method packages sets of information so that they may be used to install the set of information. The packaging is performed by one of several client computer systems using the set of information and metadata describing the set of information, requested from a server.

10 Claims, 4 Drawing Sheets

SYSTEM AND METHOD FOR PACKAGING UPDATES

CROSS REFERENCE TO RELATED APPLICATION

This is a continuation of U.S. patent application Ser. No. 10/298,860, filed 18 Nov. 2002 now U.S. Pat. No. 7,194,728, which is incorporated herein by reference, to which priority is claimed, and which claims the benefit of U.S. provisional patent application Ser. No. 60/417,583 entitled, "Method and Apparatus for Packaging Updates," filed by Josh Sirota and Charlie Ma on Oct. 10, 2002 to which priority is claimed and which is hereby incorporated by reference in its entirety.

FIELD OF THE INVENTION

The present invention is related to computer software and more specifically to computer software for updating computer systems.

BACKGROUND OF THE INVENTION

Computer systems employ sets of information. A set of information may be a computer application program, or one or more files containing data, such as sales information.

To update a computer system with a set of information, automated tools may be used. Such automated tools receive the state of a target computer system and compare that state with the state of a computer system onto which the set of information has been installed. The automated tools then use the result of the comparison to determine the files and other information in the set of information that are not on the target computer system. The automated tools can then supply such files and other information that can be used to update the target computer system so that it has the set of information.

The determination of the files and other information such as registry information that are changed (e.g. added, deleted or modified) when a set of information is installed on a computer system may not be obvious. For example, a complex computer software application may have hundreds of different files. If the software application is an upgrade from a prior version, some of the files of the prior version may be left alone, some may be deleted, others may be replaced by new versions, and still other files may be added. Thus, it can be desirable to compare the state of a computer system before a set of information is installed, with the state of the computer system after the set of information is installed. The differences can be noted and the new or modified files supplied to a program that will create a package of the new or modified files and other information useful for changing a computer system in a manner similar to the changes made to a computer system on which the set of information has been installed. This process is referred to herein as "packaging" the set of information.

To determine the changes that are made when a set of information is installed on a computer system, the computer system can be placed in a state that is known (or the state of the computer system before the set of information is installed may be ascertained), and then the set of information is applied to the computer system. For example, if the set of information is a software package, after the computer system has been placed in a known state, the software package is then installed. The state of the computer system after the software package has been installed is then compared with the known state of the computer system to determine the changes that the installation produced.

There is a problem with this approach. The process of placing the computer into the known state and the process of installing some software packages can be time consuming. An operator performing the various steps must initiate the step and then wait for the step to complete. Although a relatively unskilled person may be used as an operator for this process, if there are many sets of information such as software packages for which the process must be completed, the expense of the operators required can become significant.

What is needed is a system and method that can reduce or eliminate the amount of operator time required to package sets of information.

SUMMARY OF INVENTION

A system and method employs an agent on each of one or more client computer systems that, for a given client, places the client computer system in a known state and requests from a server a storage location of a set of information and a command line instruction that can install the set of information onto the client. The server keeps track of which sets of information have been processed in this manner and provides the storage location and command line instruction for the next unprocessed set of information when requested by the client computer system. The agent then provides that storage location and command line instruction to an operating system on the client computer system so as to cause the set of information to be installed on the client computer system. The agent then executes a packager that identifies the state of the client computer system after the installation, compares the identified state with the known state, builds a set of files and other information that are useful in updating another computer system with the set of information and stores the set of files at the storage location provided by the server. The agent then repeats the process.

DETAILED DESCRIPTION OF A PREFERRED EMBODIMENT

Figure 1:
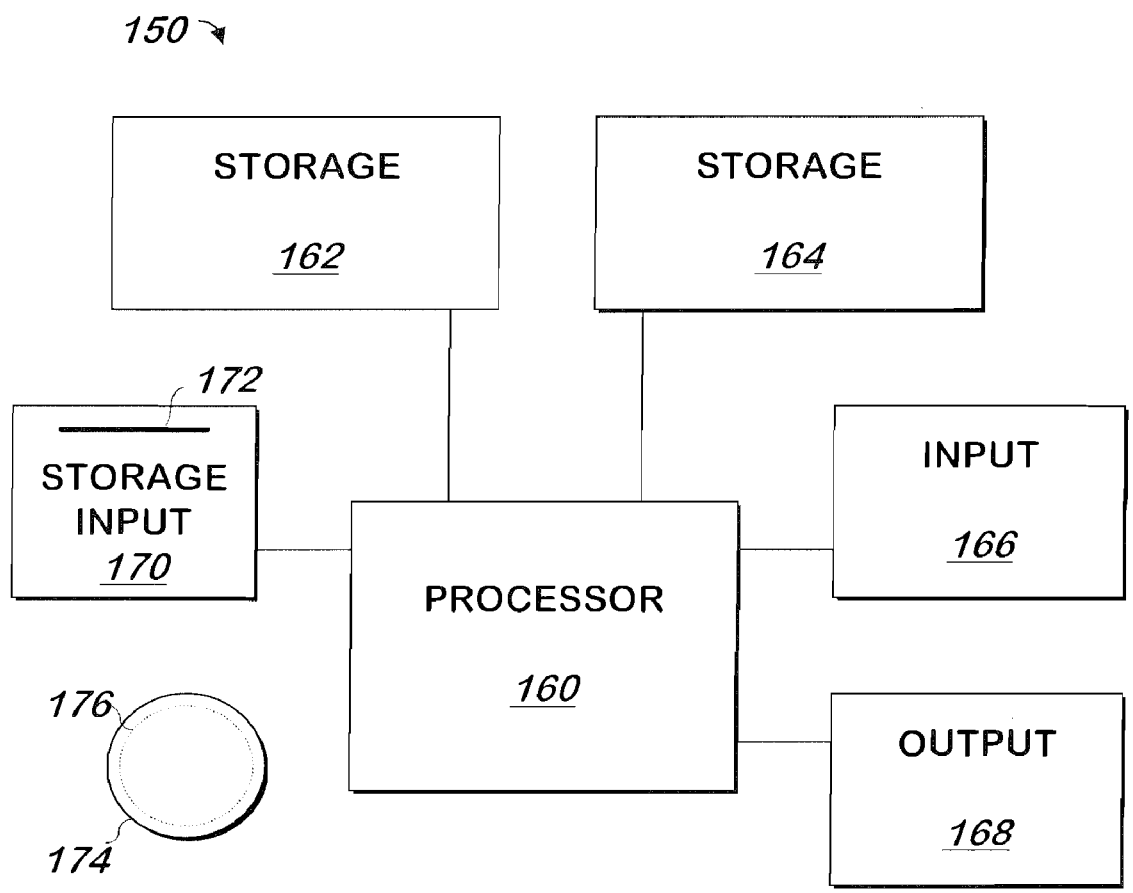
FIG. 1 is a block schematic diagram of a conventional computer system.

The present invention may be implemented as computer software on one or more conventional computer systems. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the Solaris operating system commercially available from SUN MICROSYSTEMS of Mountain View, Calif., a Pentium-compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MACOS or OPENSTEP operating system commercially available from APPLE COMPUTER CORPORATION of Cupertino, Calif. and the INTERNET EXPLORER browser commercially available from MICROSOFT CORPORATION although other systems may be used.

Figure 2A:
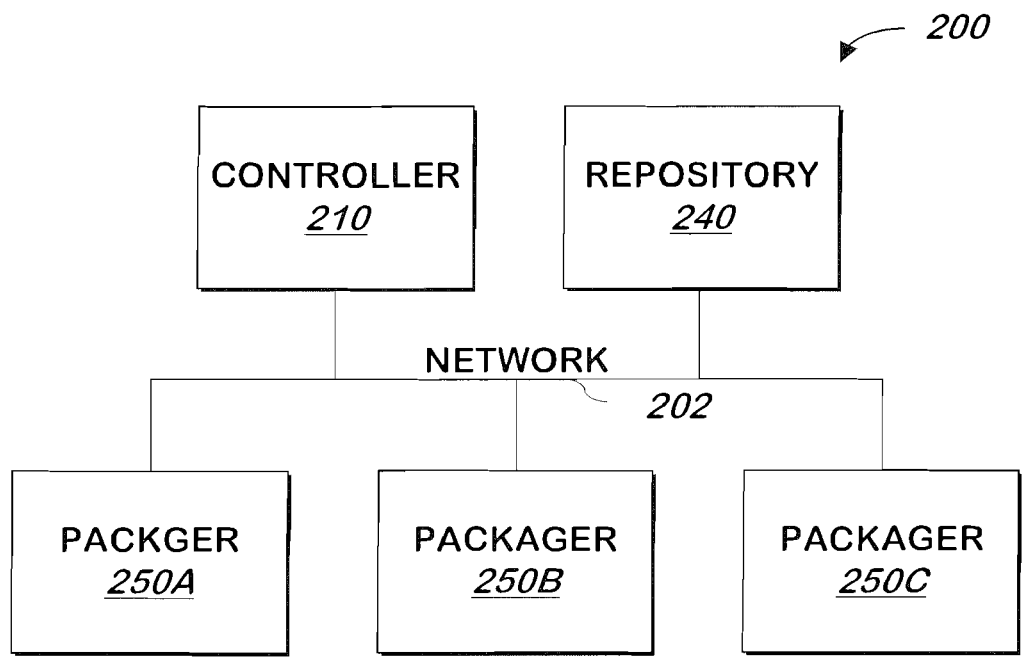
FIG. 2A is a block schematic diagram of a system for packaging sets of information, including a controller and a packager, according to one embodiment of the present invention.

Referring now to FIG. 2A, a system 200 for packaging sets of information is shown according to one embodiment of the present invention. The system 200 includes three types of components 210, 240, 250A C, illustrated physically separate in the Figure. In one embodiment, Each component 210, 240, 250A C may reside in a different computer system such as the computer system 150 of FIG. 1. However, two or more of the components 210, 240, 250A C may physically reside in the same computer system in other embodiments of the present invention, and any of the components 210, 240, 250A C may reside in multiple computer systems such as multiple systems 150 of FIG. 1. Components 210, 240, 250A C not residing together physically may be coupled by network 202, which is a conventional network such as a conventional Ethernet network.

System 200 includes a controller 210 that directs the operation of the packagers 250A C to retrieve sets of information from repository 240, package the sets of information and store the package on repository 240. Although three packagers 250A C are shown in the Figure, there may be any number of one or more packagers 250A C according to the present invention.

In one embodiment, repository 240 is a conventional file server or database server with sufficient disk space for the storage of sets of information and packages as described herein. Repository may appear to packagers 250A C as a, or on a, network drive having a drive designator that is the same on each packager 250A C, such as "R:".

Stored on repository 240 are sets of information to be packaged as described herein. Sets of information may be one or more sets of files, compressed or uncompressed. Although as described herein, each set of information is an uninstalled computer software application, such as the conventional Microsoft Word word processing program, copied from an installation media such as a CD-ROM, a set of information can include any number of files, including a single file, and it may include one or more data files, program files or both.

The installation media is copied onto repository 240 with any compression remaining in the copy so that the copy is essentially identical to a CD-ROM installation disk that would be inserted into a local CD-ROM drive on a non-networked personal computer in order to install the application program residing on the CD-ROM drive or other installation media.

In one embodiment, each set of information to be packaged resides on its own subdirectory on repository 240. For example, Microsoft Word XP may reside on the directory "R:/Microsoft/WordXP/".

A system administrator creates a subdirectory in repository 240 and copies the set of information to that subdirectory using conventional operating system commands. For example, if the set of information to be packaged is a CD-ROM installation disk of an application program, the system administrator would copy the entire contents of the CD-ROM to a subdirectory created by the system administrator, for example, by placing it in a CD-ROM drive and dragging the top level subdirectory or subdirectories and files on the installation CD-ROM into the subdirectory on the repository 240.

As described herein, subdirectories created using operating system commands are used to store each set of information, however, as described herein, repository 240 may include a conventional database such as the conventional SQL Server product commercially available from Microsoft Corporation of Redmond, Wash., in which case, database records created using conventional database commands may be used in place of subdirectories.

The system administrator then adds to an entry in a table that is maintained by controller 210 at least two items, including the path of the subdirectory (e.g. "R:/Microsoft/WordXP/"), and the operating system command (e.g. "setup" or "install") that, when appended to the end of the path and supplied to an operating system on one of packagers 250A C would cause the set of information to be installed onto that one of the packagers 250A C.

Figure 2B:
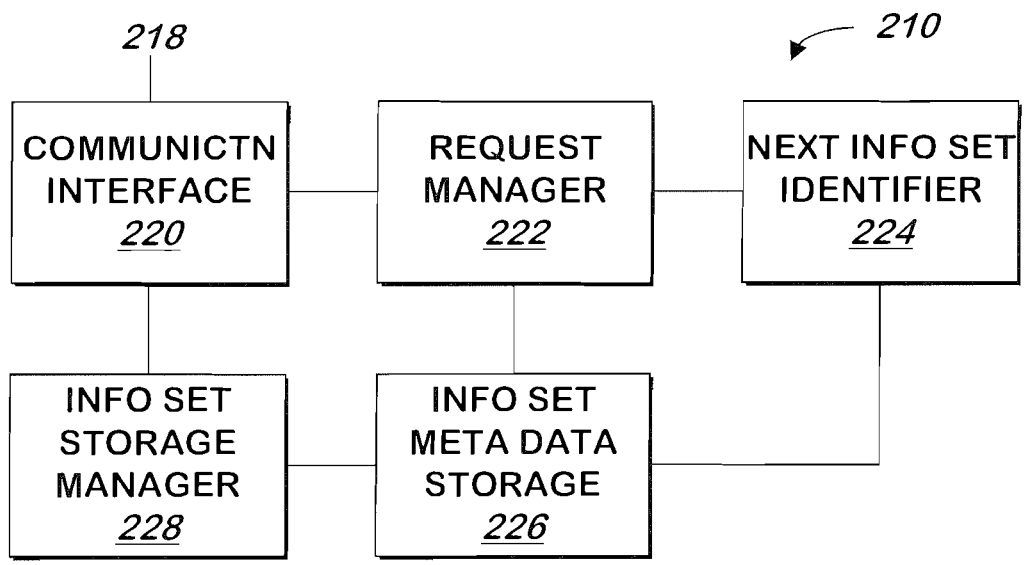
FIG. 2B is block schematic diagram of the controller of FIG. 2A according to one embodiment of the present invention.

FIG. 2B shows controller 210 of FIG. 2A in more detail according to one embodiment of the present invention. Referring now to FIGS. 2A and 2B, to add an entry to the table, a system administrator connects to controller 210 using a conventional browser on a personal computer (not shown) coupled to network 202, although in other embodiments, the system administrator uses a conventional user interface supplied by information set storage manager 228.

In one embodiment, all communication into or out of controller 210 is made via input/output 218 of communication interface 220, which is coupled to network 202. Communication interface 220 is a conventional communication interface that supports TCP/IP or other conventional communication protocols, such as a conventional Ethernet network interface card, suitably configured.

When the system administrator connects to the controller 210 using a browser, he or she connects to a port on controller 210 that causes communication interface 220 to forward any communication received on that port to information set storage manager 228, which provides a user interface allowing changes to be made to the table.

The system administrator then indicates to information set storage manager 228 that he or she wishes to add an entry to the table, and supplies text containing the subdirectory on which a set of information to be packaged is located and the operating system command that runs the installer, collectively referred to herein as metadata. Storage manager 228 receives this metadata and adds it as a new entry to a table it maintains in information set metadata storage 226. Although a table is used as a data structure as described herein, any data structure may be used in other embodiments.

Each entry in the table in information set metadata storage 226 represents a row of the table, with the metadata described above being stored in each of two different columns. Another column in the table indicates whether the metadata in an entry has been requested by one of the packagers 250A C. This column is used as a proxy to indicate that the packaging process for the set of information corresponding to the entry has been completed, although as described in more detail below, a confirmation column in the table may be used to confirm that the packaging process did in fact complete. When storage manager 228 adds the metadata as a new entry, it clears the indication that the metadata for that entry has been requested.

Once the system administrator has added one or more entries to the table in metadata storage 226, the system administrator may start the operation of one or more packagers 250A C.

Figure 2C:
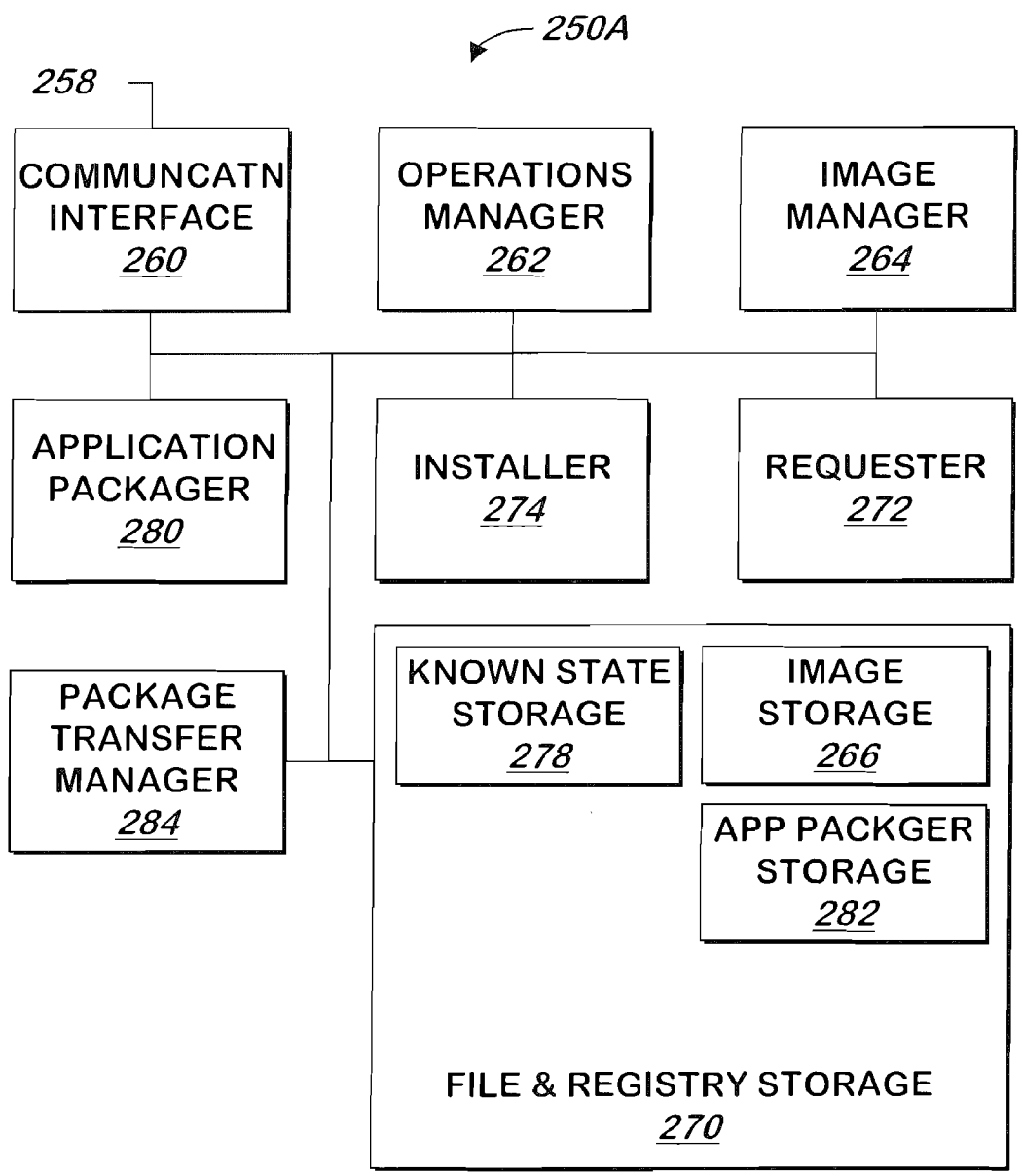
FIG. 2C is block schematic diagram of a representative packager of FIG. 2A according to one embodiment of the present invention.

A representative one 250A of packagers 250A C is shown in more detail in FIG. 2C. Although packager 250A is shown and described, the other packagers 250B C operate in a similar or identical manner and may be operated concurrently with the other packagers 250A C. Referring now to FIGS. 2A 2C, the system administrator starts the operation of packager 250A using a conventional browser to connect to a particular port on packager 250A for starting and stopping operation of packager 250A.

In one embodiment, all communication into or out of packager 250A is made via input/output 258 of communication interface 260 which is coupled to network 202. Communication interface 260 is a conventional communication interface that supports TCP/IP or other conventional communication protocols, such as a conventional Ethernet network interface card, suitably configured. Communications received by communication interface 260 on the port for starting and stopping operation of packager 250A are forwarded to operations manager 262.

In one embodiment, operations manager 262 includes a JAVA program that operates as described herein. (The JAVA programming language is available from SUN MICROSYSTEMS of Mountain View, Calif.) Operations manager 262 provides a user interface to the system administrator via communication interface 260 that allows the operation of packager 250A to be started and stopped. If the system administrator indicates that operation should be started, operations manager 262 signals image manager 264.

Image manager 264 is a conventional image restorer that restores the entire file and registry system in file and registry storage 270 of a computer system to a particular state. File and registry storage 270 may include some or all of a conventional hard disk of the computer system that includes packager 250A. In one embodiment, image manager 264 may include the conventional NORTON GHOST program commercially available from SYMANTEC CORPORATION of Cupertino, Calif. When signaled, image manager 264 uses a stored version of the particular state that is stored in image storage 266 to place the file and registry storage 270 into the particular state. When image manager 264 has completed placing the file and registry storage 270 into the particular state, image manager 264 transfers control back to operations manager 262.

When control is so transferred, operations manager 262 signals requester 272. Although described as occurring after the operation of image manager 264, the signaling of requester 272 may be performed before, during or after the operation of image manager 264 described above. When signaled, requester 272 requests via communication interface 260, metadata from the table by sending a request to a specific destination port on controller 210. The request includes as a source IP address and port, the IP address of packager 250A and a port number that identifies any response as a communication that communication interface 260 should forward to requester 272. Other embodiments use other conventional communications techniques for sending requests, and receiving responses described below.

Referring again to FIG. 2B, communications interface 220 on controller 210 receives the request and, because of the specific destination port number to which the request was addressed, sends the request to request manager 222. Request manager 222 receives the request and signals next information set identifier 224.

Next information set identifier 224 scans the table of metadata in information set metadata storage 226 for the next entry that is not marked as having been requested, marks it as having been requested, retrieves the remainder (e.g. the metadata) of that entry and provides it to request manager 222. Request manager 222 formats the remainder of the entry it receives from next information set identifier 224 into a response to the request, and provides via communication interface 220 the response to the packager 250A C from which the request was received, in this case, packager 250A to the port number identified as the source port number in the request.

Referring again to FIG. 2C, communication interface 260 receives the response, and because of the destination port number in the response, forwards it to requester 272. Requester 272 extracts the metadata from the response and provides it to operations manager 262. Operations manager 262 provides the metadata to installer 274, which may physically be a part of the same Java program as operations manager 262.

Installer 274 combines the path and the command from the metadata it receives into an operating system command and provides it to the operating system (not shown) on the packager. If the path is "R:/Microsoft/WordXP/", and the installation command is "install/nodialog", installer 274 provides to the operating system of packager 250A the command "R:/Microsoft/WordXP/install/nodialog". In one embodiment, the "nodialog" (which may be specified using other terms such as "silent") part of the command is a switch that requests that the installation occur with no dialog boxes requesting information, such as the directory into which the application program will be installed, and any options that may be specified, using instead either an answer file or setup file (which may be stored in the subdirectory in repository 240 into which the set of information being installed is stored) for the responses to the prompts that conventional installation programs provide, or using default values. If no similar option is available, an operator may enter the responses to the prompts that the installation provides. Although an operator is involved in this case, the interaction the operator provides is still greatly reduced and a single operator can operate multiple packagers 250A C.

In one embodiment, when operations manager 262 signals installer 274 as described above, operations manager 262 also sets a timer that is longer than the expected amount of time that will be required to install the set of information. This amount of time may be part of the metadata that is stored in information set metadata storage 226 as described above, supplied by the system administrator for each set of information and received by operations manager 262 with the other metadata as described above, or may be a fixed amount of significantly long enough time to allow for the installation of any set of information. If the timer elapses before installer 274 transfers control back to operations manager 262, installer will assume that the installation has stopped (for example because it is waiting for input that was not expected) and will start the imaging and requesting process again for a different set of information. In such embodiment, the request may contain an indication that there was an error with the prior set of information so that suitable corrections may be made, and so that it will not be reassigned to another packager 250A C.

If the installation of the set of information completes normally, when the installation is complete, the information set will have been installed into file and registry storage 270, and control will transfer back to installer 274, which transfers control to operations manager 262. Operations manager 262 then signals application packager 280.

Application packager 280 is a conventional program that identifies the changes that were made to file and registry storage 270 by scanning the file structure and certain registries (in one embodiment, the registries are HKEY-CURRENT-USER, HKEY-LOCAL-MACHINE, HKEY -USERS and HKEY-CLASSES-ROOT) and identifying the changes to the file structure and these certain registries that were made by the installation of the set of information as described above. The signal to start application packager 280 from operations manager 262 may be made by means of a conventional batch file called from the operating system of packager 250A that in turn calls application packager 280. In one embodiment, application packager 280 identifies changes to some or all of the file and registry structure of packager 250A by scanning some or all of the file system and registries stored in file and registry storage 270, building a status structure representing the current status of the some or all of the file system and registries, and comparing the status structure against a status structure of the known state that application packager 280 or another similar one) produced and stored in known state storage 278. The status structure of the known state is part of the known state and will be restored as part of the imaging process described above.

Application packager 280 then builds an installation structure that indicates the changes between the status structure of the known state and the status structure built by application packager 280 after the installation as described above. In one embodiment, application packager 280 includes the conventional Shrinkwrap Packager contained in the conventional Application Packager commercially available from MARIMBA, Inc of Mountain View, Calif., although other similar programs may be used. Application packager 280 stores the installation structure in application packager storage 282 and returns control to operations manager 262. The process described as having been performed by application packager 280 is referred to herein as "packaging" and it may be performed on any set of information, which may be an application or other set of one or more files. In one embodiment, application packager 280 operates as described in U.S. Pat. No. 5,919,247 "Method for the Distribution of Code and Data Updates" issued Jul. 6, 1999, and U.S. Pat. No. 6,367, 075 "Method and Apparatus for Providing Instructions Describing the Removal of Updates to a Computer System" issued Apr. 2, 2002, having the same assignee as the present application and each is incorporated by reference in their entirety.

When such control is returned, operations manager 262 signals package transfer manager 284, which may be physically part of the same JAVA program as operations manager 262 or may be part of application packager 262. In one embodiment, operations manager 262 provides to package transfer manager 284 the subdirectory from which the set of information to be packaged was retrieved.

Package transfer manager 284 retrieves the installation structure from packager storage 282 and stores the installation structure in that subdirectory on repository 240. Package transfer manager 284 also copies to that subdirectory on repository 240 files in file and registry storage 270 for which the installation structure indicates such files were added as part of the installation process.

Although a two step process is described herein, in which the package is created and then transferred, in one embodiment, the functions of application packager 280 and package transfer manager 284 are performed by application packager 280, which builds the package in the subdirectory in repository 240. In such embodiment, operations manager 262 provides the path of the subdirectory to application packager 280 when it signals application packager 280. If a database is used, a record identifier is used in place of the path of the subdirectory.

Package transfer manager 284 then transfers control to operations manager 262. Operations manager 262 signals image manager 264 and begins a repetition of the process described above for any additional applications to be packaged.

Referring now to FIGS. 2A C, in one embodiment, as part of the request described above, requester 272 may provide to request manager 222 the metadata for any set of information it has just completed processing in the immediately prior repetition of the process described above. In such embodiment, request manager 222 marks the entry in the table in information-set metadata storage 226 as confirmed.

In one embodiment, marking the metadata in an entry as having been requested as described above is performed by entering a timestamp in the completed column of the entry, such timestamp being a date and time of the system clock requested from an operating system (not shown). Periodically, request manager 222 requests the current date and time from the operating system and scans the table in information set metadata storage to find entries marked as having been requested that are older than a threshold amount of time before the current time that are not marked as confirmed. Request manager 222 removes the date and time of the request from such entries, identifying them as not having been requested so that they may be selected again for packaging as described above.

If, during this process, requester 272 makes another request as described above, and there is no unrequested entry in the table in information set metadata storage 226, request manager 222 will respond with an indication that no more entries are available. In such embodiment, requester 272 will receive the request and so indicate to operations manager 262. Operations manager may terminate operation or may optionally resignal requester 272 to rerequest another entry after waiting a period of time.

In an alternate embodiment of the present invention, metadata in each entry in the table of information set metadata storage 226 includes an indication of a specific known state from several known states into which the packager 250A C should be placed as described above. In such embodiment, the request described above is made and received prior to image manager 264 placing the packager 250A C into the known state so that the specific known state into which the packager should be placed may be received in the response to the request. In such embodiment, requester 272 passes this additional metadata to operations manager 262, which provides image manager 264 with the known state. Image manager 264 places the packager 250A C into that known state. This allows updates to be automatically performed for various starting states by entering several entries of metadata, with the same subdirectory and installer command, but different starting states.

In another embodiment, the metadata stored for each set of information may contain a template or indication of a template that has been prestored in file and registry storage 270 that includes rules that can be used by application packager 280, rules that will be used for the application of a package to a computer system, or both. The rules that can be used by application packager 280 may include, for example, the subdirectories, types of files or portions of registries that application packager 280 should use in the comparison described above. This can allow application packager 280 to operate more quickly, comparing only files according to the template, ignoring others that might be known not to change during the installation of the set of information. The rules for the application of the package may include rules for handling conflicts with existing files on the machines onto which the package will be applied. Such rules may indicate to the system that applies the package to a computer system that, for example, if the package being applied to a computer system has a file with the same name and being installed in the same subdirectory as an existing file, the existing file should be retained and not replaced if it has a creation date that is later than the creation date of the file from the package. In one embodiment, the template is an XML template that is prestored in file and registry storage 270 and is communicated from operations manager 262 as a command line parameter used to call application packager 280.

Figure 3:
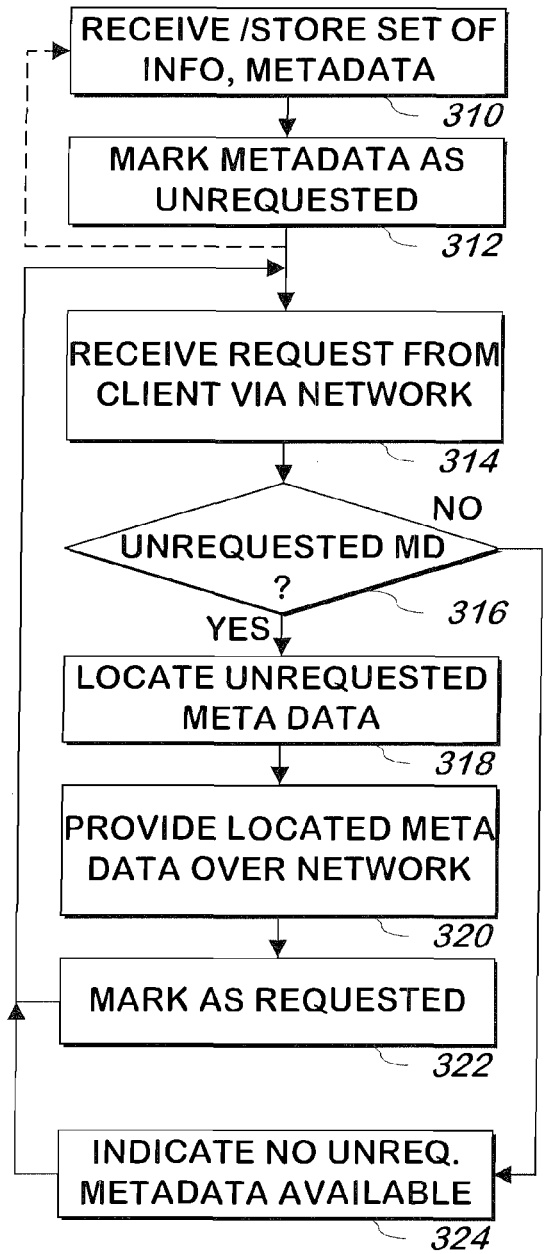
FIG. 3 is a flowchart illustrating a method of receiving a set of information and receiving and providing metadata related to the packaging of information according to one embodiment of the present invention.

Referring now to FIG. 3, a method of receiving a set of information and receiving and providing metadata related to the packaging of information is shown according to one embodiment of the present invention. A set of information and metadata about the set of information is received and stored 310 as described above and the metadata is marked 312 as unrequested as described above. The set of information may be stored on a repository and the metadata stored on a server such as the controller described above or they may be stored together on a single server. Steps 310 and 312 may be part of an independently and continuously running process as indicated by the dashed line in the Figure.

A request is received 314 from one of several client computer systems over a network as described above. If there is metadata marked as unrequested as described above 316, such metadata for one set of information is located 318 and provided 320 over the network to the client from which the request was received. The metadata may be marked 322 as requested as described above and the method continues at step 314.

If no unrequested metadata is available 316, an indication of this state is provided 324 over the network to the client computer from which the request was received and the method continues at step 314.

The marking as requested in step 322 may include a timestamp and the request received in step 314 may include a confirmation, which is stored as part of step 314, and unconfirmed but completed entries older than a certain amount of time may be periodically marked as unrequested as described above. If the request is received with an indication that the prior set of information was not packaged due to an error, the set of information may be marked so that it is not provided again until suitable corrective measures have been taken, or marked to be provided to a packager being monitored by an operator.

Figure 4:
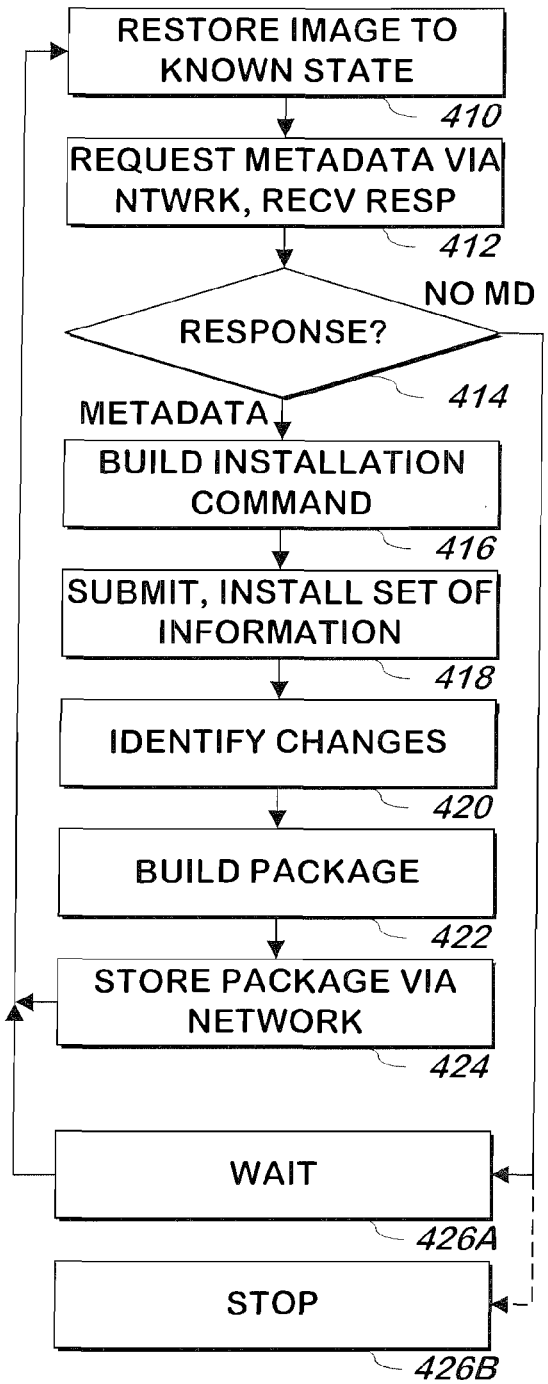
FIG. 4 is a flowchart illustrating a method of packaging sets of information according to one embodiment of the present invention.

Referring now to FIG. 4, a method of packaging sets of information, such as software applications, is shown according to one embodiment of the present invention. The file and registry image of a client computer system may be restored to a known state 410 and metadata is requested and a response received 412 from a server via a network as described above.

If the response received in step 412 contains metadata about a set of information 414, the method continues at step 416 and otherwise, the method continues at step 426A in one embodiment or 426B in another embodiment.

At step 416, the metadata received in the response is used to build an installation command which is then submitted, for example, to an operating system, to install the set of information 418. Changes to the some or all of the file and registry structure resulting from the installation are identified 420 as described above and a package describing the changes and containing the files to be added is built 422 and stored 424 as described above. The package may be built to contain information about the subsequent installation of the package received as part of the metadata as described above. The method continues at step 410.

As described above, step 410 may be performed after step 414 and may be responsive to the metadata, for example, if the metadata specifies a particular known state from several known states. In such embodiment, the metadata received and stored of step 310 and provided in step 320 of FIG. 3 would also include the particular known state of the several known states into which the client computer system is to place itself.

Step 426A or 426B follows step 414 if the server responds that there is no metadata marked as unrequested as described above. At step 426A, the method waits and continues at step 410. In another embodiment, illustrated in step 426B and using the dashed line in the Figures, the method terminates.

What is claimed is:

1. A computer-implemented method to create a plurality of installation packages, comprising:
    storing an installation entry identifying a path to one or more files and having a command to install the one or more files, the installation entry associated with a first known state into which a file system or a registry system is to be placed;
    receiving a first request from a first computer system to install at least one of the one or more files;
    creating a first response including at least the path and the command; and
    sending the first response to the first computer system to install at least one of the one or more files based on the path and the command when a first file system or a first registry system of the first computer system is placed in the first known state.

2. The method of claim 1, further comprising:
    receiving a first installation package from the first computer system, the first installation package indicative of changes between the first file system or the first registry system of the first computer system in the first known state and a subsequent state after installation of the at least one of the one or more files; and
    storing the first installation package in a directory associated with the path of the installation entry.

3. The method of claim 2, further comprising:
receiving a second request from a second computer system to install at least one of the one or more files, the second computer system having a second file system or a second registry system being placed in the first known state;
creating a second response from information in first installation package; and
sending the second response to the second computer system to install the first installation package on the second computer system.

4. The method of claim 1, further comprising:
receiving a second installation package from a second computer system, the second installation package indicative of changes between a second file system or a second registry system of the second computer system in a second known state and a subsequent state after installation of the one or more files; and
storing the second installation package in the directory associated with the path of the installation entry.

5. The method of claim 4, further comprising:
receiving a second request from a third computer system to install at least one of the one or more files, the third computer system having a third file system or a third registry system being placed in the second known state;
creating a second response from information in the second installation package; and
sending the second response to the third computer system to install the second installation package on the third computer system.

6. The method of claim 1, wherein a server computer system stores the one or more files.

7. The method of claim 1, wherein the one or more files are associated with an application.

8. The method of claim 1, further comprising storing a plurality of installation entries associated with the first known state, each of the installation entries having a path to one or more files to be installed and a command to install the one or more files.

9. The method of claim 8, further comprising:
receiving a subsequent request for installation from the first computer system after the one or more files of the first response have been installed;
creating a subsequent response comprising the path and the command in a next of the installation entries; and
sending the subsequent response to the first computer system to install at least one of the one or more files of the next installation entry on the first computer system.

10. A program storage device having instructions stored for causing a programmable control device to perform a method in accordance with claim 1.

* * * * *